United States Patent
Yum et al.

(10) Patent No.: US 10,771,141 B2
(45) Date of Patent: Sep. 8, 2020

(54) METHOD FOR CHANNEL STATE REPORT IN WIRELESS COMMUNICATION SYSTEM, AND DEVICE THEREFOR

(71) Applicant: LG Electronics Inc., Seoul (KR)

(72) Inventors: Kunil Yum, Seoul (KR); Kijun Kim, Seoul (KR); Yunjung Yi, Seoul (KR); Jiwon Kang, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,452

(22) PCT Filed: Jul. 26, 2017

(86) PCT No.: PCT/KR2017/008036
§ 371 (c)(1),
(2) Date: Dec. 17, 2018

(87) PCT Pub. No.: WO2018/021815
PCT Pub. Date: Feb. 1, 2018

(65) Prior Publication Data
US 2019/0140723 A1    May 9, 2019

Related U.S. Application Data

(60) Provisional application No. 62/401,161, filed on Sep. 28, 2016, provisional application No. 62/379,748, (Continued)

(51) Int. Cl.
*H04B 7/06* (2006.01)
*H04W 76/27* (2018.01)
(Continued)

(52) U.S. Cl.
CPC ......... *H04B 7/0626* (2013.01); *H04B 7/0417* (2013.01); *H04L 5/005* (2013.01);
(Continued)

(58) Field of Classification Search
CPC .. H04B 7/0626; H04B 7/0417; H04B 7/0639; H04B 7/0632; H04W 76/27; H04W 72/042; H04L 5/0055
See application file for complete search history.

(56) References Cited

U.S. PATENT DOCUMENTS

2013/0336214 A1    12/2013  Sayana et al.
2014/0079100 A1*    3/2014  Kim ................... H04B 7/0417
                                                           375/219
(Continued)

OTHER PUBLICATIONS

Huawei, et al., "Discussion on CSI feedback for short TTI," 3GPP TSG RAN WG1 Meeting #85, dated May 23-27, 2016, 4 pages.
(Continued)

*Primary Examiner* — Jamal Javaid
(74) *Attorney, Agent, or Firm* — Fish & Richardson P.C.

(57) ABSTRACT

A channel state reporting method on the basis of an aperiodic channel state information-reference signal (CSI-RS) in a wireless communication system according to an embodiment of the present invention may comprise the steps of: receiving an aperiodic channel state information (CSI) request; and transmitting aperiodic CSI-RS-based CSI at a timing corresponding to one among a plurality of candidate values in response to the aperiodic CSI request, wherein the plurality of candidate values are selected according to a CSI-related parameter, and the CSI-related parameter includes at least one among a type of information included in the CSI, frequency granularity of the CSI, use or non-use of a code book when the CSI is derived, and the number of antenna ports of the CSI-RS.

12 Claims, 8 Drawing Sheets

(a)

(b)

Related U.S. Application Data filed on Aug. 26, 2016, provisional application No. 62/367,065, filed on Jul. 26, 2016.

(51) Int. Cl.
    *H04B 7/0417*     (2017.01)
    *H04L 5/00*     (2006.01)
    *H04W 72/04*     (2009.01)
    *H04B 17/24*     (2015.01)
    *H04W 24/10*     (2009.01)

(52) U.S. Cl.
    CPC ......... *H04L 5/0055* (2013.01); *H04W 72/042* (2013.01); *H04W 76/27* (2018.02); *H04B 7/0632* (2013.01); *H04B 7/0639* (2013.01); *H04B 17/24* (2015.01); *H04W 24/10* (2013.01)

(56) References Cited

U.S. PATENT DOCUMENTS

| | | |
|---|---|---|
| 2015/0162966 A1 | 6/2015 | Kim et al. |
| 2015/0181453 A1 | 6/2015 | Chen et al. |
| 2016/0205579 A1 | 7/2016 | Cheng et al. |
| 2016/0212733 A1* | 7/2016 | Davydov ............. H04B 7/0626 |

OTHER PUBLICATIONS

International Search Report in International Application No. PCT/KR2017/008036, dated Nov. 20, 2017, 10 pages.

\* cited by examiner (a)          (b)

METHOD FOR CHANNEL STATE REPORT IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/008036, filed on Jul. 26, 2017, which claims the benefit of U.S. Provisional Application No. 62/401,161, filed on Sep. 28, 2016, U.S. Provisional Application No. 62/379,748, filed on Aug. 26, 2016, and U.S. Provisional Application No. 62/367,065, filed on Jul. 26, 2016. The disclosures of the prior applications are incorporated by reference in their entirety.

TECHNICAL FIELD

The present invention relates to a wireless communication system, and more particularly, to a method for reporting a channel state and apparatus therefor.

BACKGROUND ART

As more communication devices request larger communication capacity, the necessity for mobile broadband communication enhanced more than the legacy Radio Access Technology (RAT) is rising. Moreover, massive Machine Type Communications (MTC), which provides various services anytime anywhere by connecting a multitude of devices and things, is one of major issues that will be considered in the next generation communication as well. Besides, there is an ongoing discussion on a communication system design in consideration of a service sensitive to reliability and latency. Thus, the introduction of the next generation RAT in consideration of enhanced Mobile Broadband Communication (eMBB), massive MTV (mMTC), Ultra-Reliable and Low Latency Communication (URLLC) and the like has been under discussion now. The corresponding technology is called New RAT in the present invention for clarity.

DISCLOSURE OF THE INVENTION

Technical Task

The present invention intends to propose a method for a channel state reporting, and more particularly, a method for an aperiodic CSI-RS based channel state reporting.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method for reporting channel state based on an aperiodic Channel State Information-Reference Signal (CSI-RS) in a wireless communication system, the method, including receiving the aperiodic Channel State Information (CSI) request and transmitting CSI based on an aperiodic CSI-RS at a timing corresponding to one of a plurality of candidate values according to to the aperiodic CSI request, wherein the plurality of the candidate values are selected according to a CSI relevant parameter and wherein the CSI relevant parameter comprises at least one selected from the group consisting of a type of information included in the CSI, frequency granularity of the CSI, information about whether or not to use a codebook in case of deriving the CSI, and the number of antenna ports of the CSI-RS.

Additionally or alternatively, the plurality of the candidate values may be configured in advance by Radio Resource Control (RRC) signaling.

Additionally or alternatively, one of the plurality of the candidate values may be indicated by a pre-designated field of downlink control information.

Additionally or alternatively, the pre-designated field of the downlink control information may be joint-encoded with another information field.

Additionally or alternatively, a timing offset, which is determined depending on whether the aperiodic CSI request is received on a physical downlink control channel or an enhanced physical downlink control channel, may be applied to a timing at which the CSI based on the aperiodic CSI-RS is transmitted.

Additionally or alternatively, a plurality of timing groups may be defined for the CSI relevant parameter each and wherein one or more candidate values are defined per timing group.

In another technical aspect of the present invention, provided herein is a terminal for reporting channel state based on an aperiodic Channel State Information-Reference Signal (CSI-RS) in a wireless communication system, the terminal, including a transmitter and receiver and a processor that controls the transmitter and receiver, wherein the processor receives the aperiodic Channel State Information (CSI) request and transmit CSI based on an aperiodic CSI-RS at a timing corresponding to one of a plurality of candidate values according to the aperiodic CSI request, wherein the plurality of the candidate values are selected according to a CSI relevant parameter and wherein the CSI relevant parameter comprises at least one selected from the group consisting of a type of information included in the CSI, frequency granularity of the CSI, information about whether or not to use a codebook in case of deriving the CSI, and the number of antenna ports of the CSI-RS.

Additionally or alternatively, the plurality of the candidate values may be configured in advance by Radio Resource Control (RRC) signaling.

Additionally or alternatively, one of the plurality of the candidate values may be indicated by a pre-designated field of downlink control information.

Additionally or alternatively, the pre-designated field of the downlink control information may be joint-encoded with another information field.

Additionally or alternatively, a timing offset, which is determined depending on whether the aperiodic CSI request is received on a physical downlink control channel or an enhanced physical downlink control channel, may be applied to a timing at which the CSI based on the aperiodic CSI-RS is transmitted.

Additionally or alternatively, a plurality of timing groups may be defined for the CSI relevant parameter each and wherein one or more candidate values are defined per timing group.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to embodiments of the present invention, channel state measurement and reporting can be performed efficiently.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
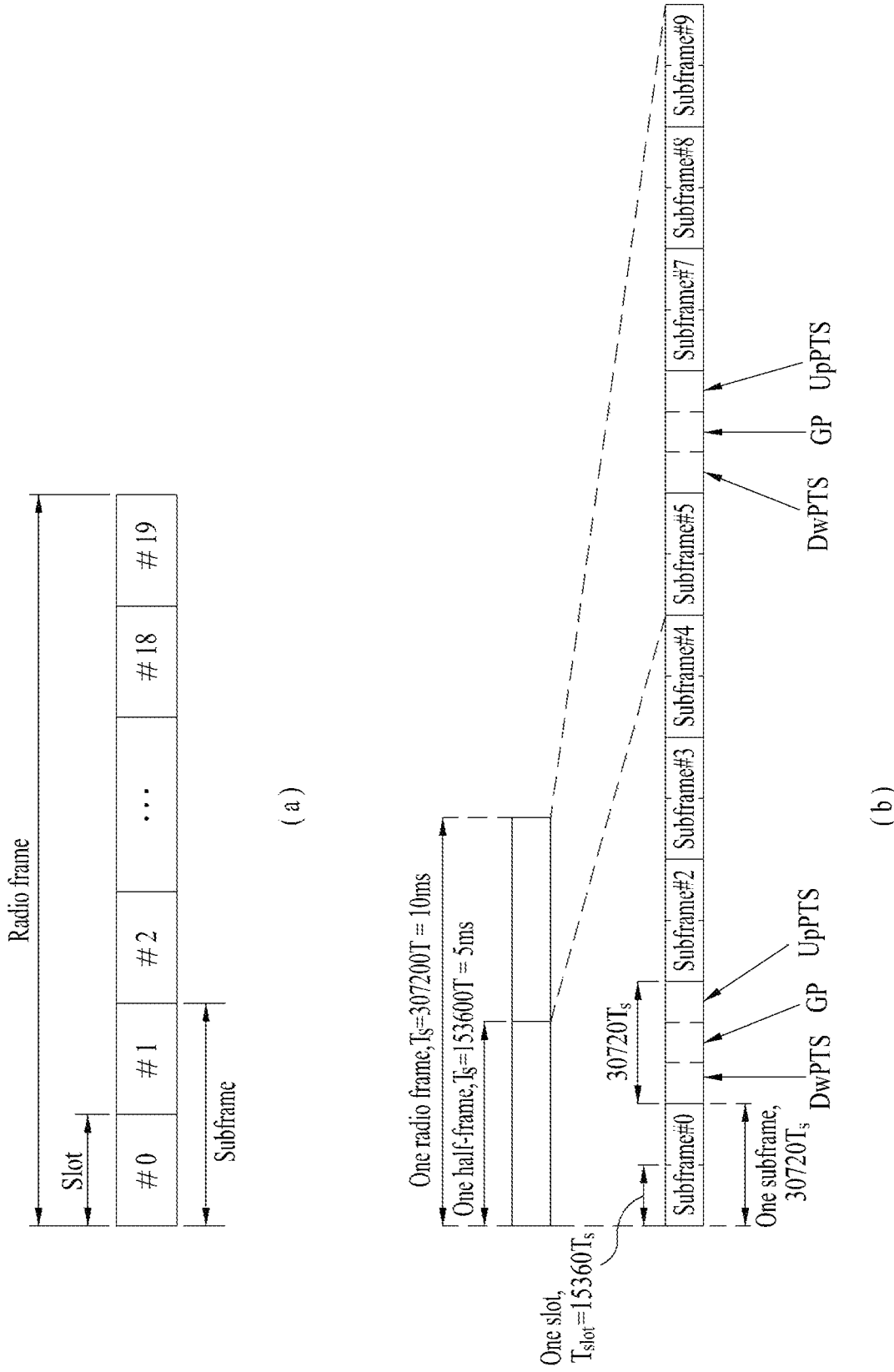
FIG. 1 shows one example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
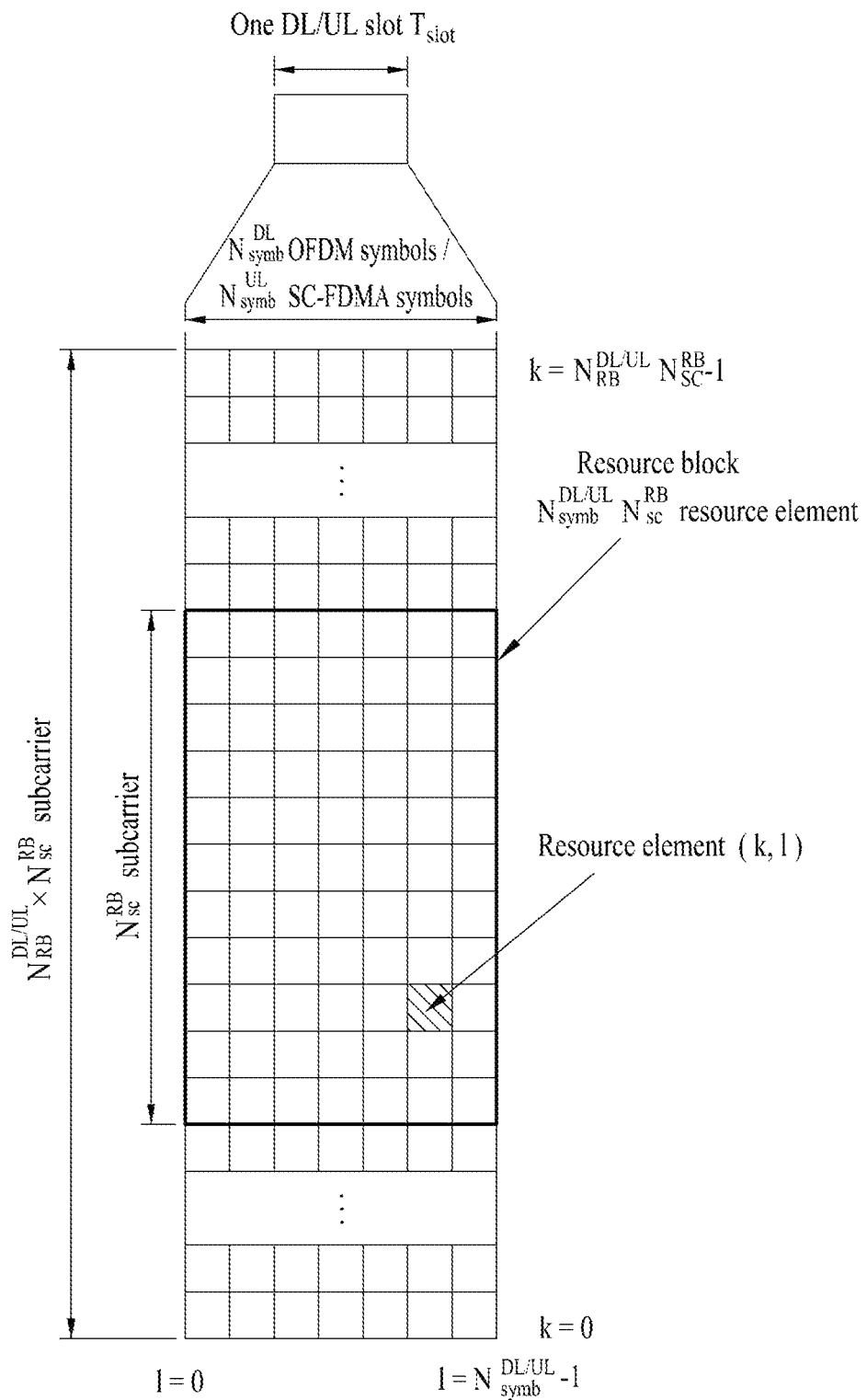
FIG. 2 shows one example of an uplink/downlink (UL/DL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
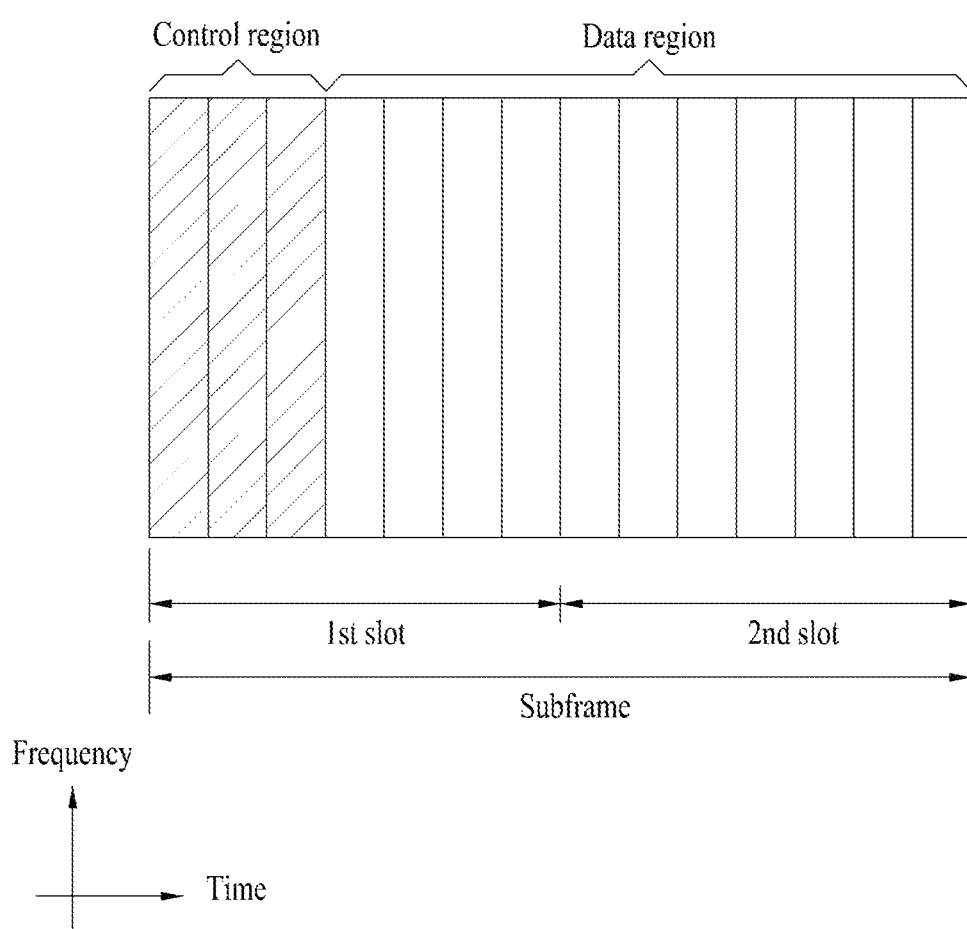
FIG. 3 shows one example of a downlink (DL) subframe structure used in the 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter.

Examples of downlink control channels used in 3GPP LTE include a physical control format indicator channel (PC-FICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCL aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
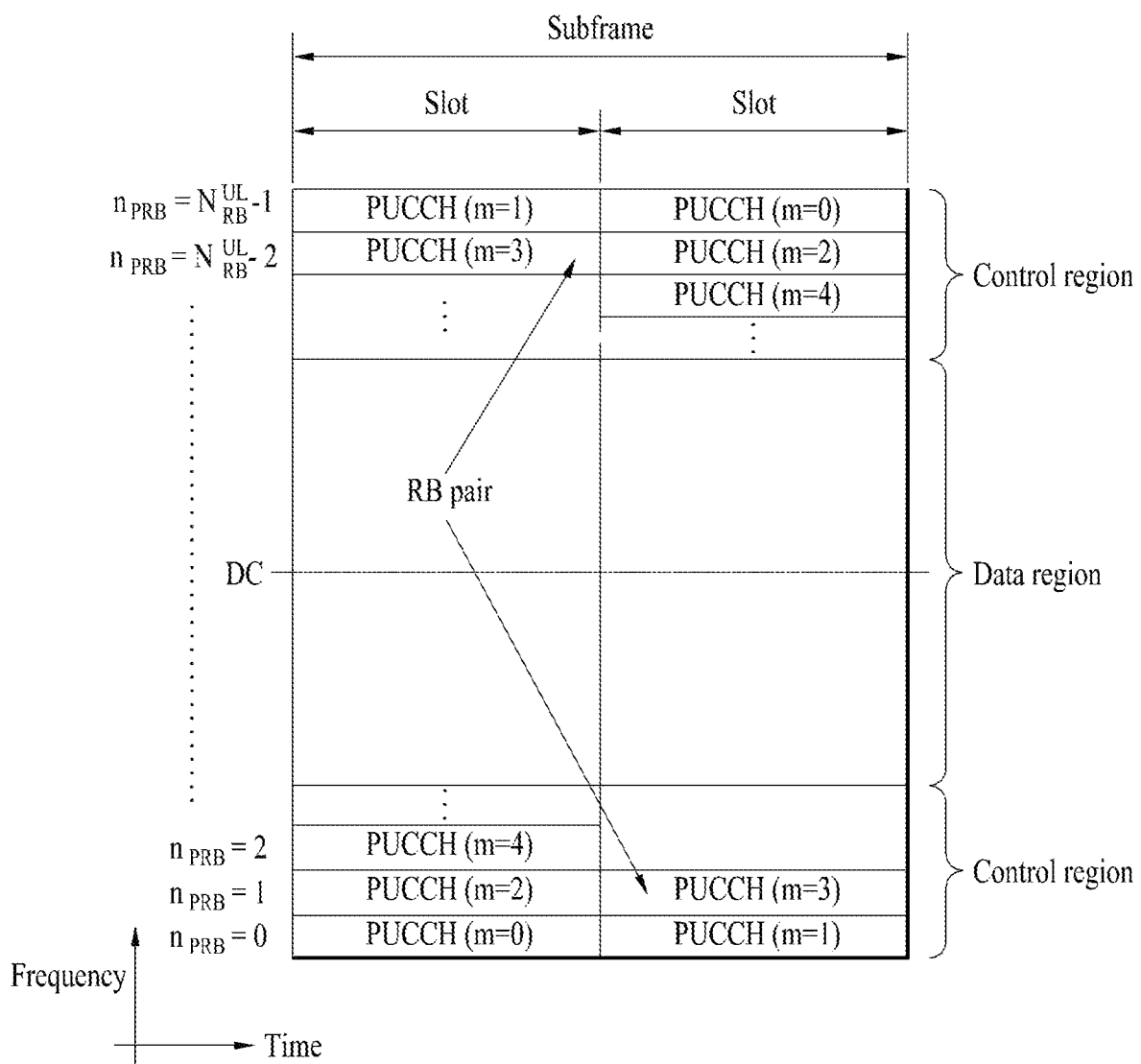
FIG. 4 shows one example of an uplink (UL) subframe structure used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI (4 bit) 2nd wideband CQI (4 bit) if RI > 1 N * Subband PMI (4 bit) (N is the total # of subbands) (if 8Tx Ant, N * subband W2 + wideband W1) |
| | UE selected (Subband CQI) | | Mode 2-0 RI (only for Open-loop SM) 1st wideband CQI (4 bit) + Best-M CQI (2 bit) (Best-M CQI: An average CQI for M SBs selected from among N SBs) Best-M index (L bit) | Mode 2-2 RI 1st wideband CQI (4 bit) + Best-M CQI (2 bit) 2nd wideband CQI (4 bit) + Best-M CQI (2 bit) if RI > 1 Best-M index (L bit) Wideband PMI (4 bit) + Best-M |

TABLE 6-continued

| | PMI Feedback Type | | |
|---|---|---|---|
| | No PMI | Single PMI | Multiple PMIs |
| Higher Layer-configured (Subband CQI) | Mode 3-0<br>RI (only for Open-loop SM)<br>1st wideband CQI (4 bit) + N * subband CQI (2 bit) | Mode 3-1<br>RI<br>1st wideband CQI(4 bit) + N * subbandCQI (2 bit)<br>2nd wideband CQI (4 bit) + N * subbandCQI (2 bit)<br>if RI > 1<br>Wideband PMI (4 bit)<br>(if 8Tx Ant, wideband W2 + wideband W1) | PMI (4 bit)<br>(if 8Tx Ant, wideband W2 + Best-M W2 + wideband W1)<br>Mode 3-2<br>RI<br>1st wideband CQI (4 bit) + N * subbandCQI (2 bit)<br>2nd wideband CQI (4 bit) + N * subbandCQI (2 bit)<br>if RI > 1<br>N * Subband PMI (4 bit)<br>(N is the total # of subbands)<br>(if 8Tx Ant, N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.
ix) Type 7: the UE transmits a CRI (CSI-RS resource indicator) and an RI.
x) Type 8: the UE transmits a CRI, an RI and a WB PMI.
xi) Type 9: the UE transmits a CRI, an RI and a PTI (precoding type indication).
xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

In 3GPP LTE, aperiodic feedback of CSI is performed after 4 or 5 ms from an aperiodic CSI request received subframe (i.e., a reference resource) (or, in a UL subframe initially available thereafter). Yet, in order to prevent a CSI aging effect and reduce latency, feedback of CSI is preferably performed in a time (e.g., less than 1 ms) shorter than that of the legacy LTE. To this end, it is considered that a feedback timing is directly designated to a UE by a base station.

This is because a CSI calculation time is particularly consumed differently depending on a case. This CSI calculation time is a time taken for a UE to derive CSI, which assumes a CSI reference resource, from the corresponding reference resource. For example, depending on whether a UE calculates CSI on a single wideband (or, subband) or CSI on a plurality of element carriers/subbands all, a CSI calculation time necessary for the UE may vary. Hence, the present invention proposes a scheme that a base station configures a feedback time, which is different according to a content (e.g., feedback type, bandwidth granularity, and UE calculation capability) to be fed back by the corresponding CSI feedback, for a UE.

CSI Feedback Timing Designation According to CSI Feedback Content

Figure 5:
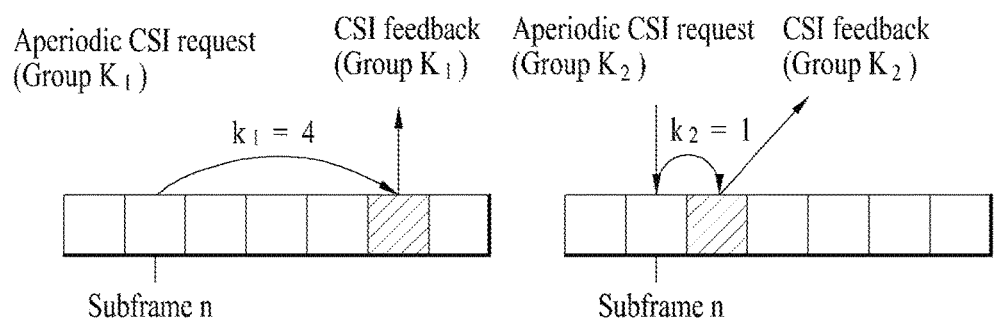
FIG. 5 shows an aperiodic CSI request and a corresponding CSI feedback timing.

A CSI feedback timing can be defined as a time taken for a UE to feed CSI back actually through a UL resource from (aperiodic) CSI request Rx/Tx timing. Namely, like $k_1$ and $k_2$ in FIG. 5, it means that a UL resource allocation for a CSI report corresponds/applies to a resource spaced apart from an aperiodic CSI request Tx timing or a subframe n in a prescribed distance. This may become a symbol or subframe unit and may be defined as a unit such as an absolute time or a mini-subframe considered by New RAT. Moreover, in the following, an (aperiodic) CSI request Rx timing may be substituted with a subframe defined as a reference resource.

The meaning of being defined as an absolute time in the above description means that a given timing can be interpreted as a different unit matching the corresponding timing according to numerology. For example, when a system supports a band having a subcarrier spacing amounting to t (t=1, 2, 3 . . . ) times of 15 kHz and a CSI feedback timing value on a band having a subcarrier spacing of 15 kHz is signaled in k (symbol unit), a CSI feedback timing value in case of having a different subcarrier spacing can be defined as t*k according to a t value each [e.g., a CSI feedback timing in 15 kHz subcarrier spacing is k, a CSI feedback timing in 30 kHz subcarrier spacing is k*2, and a CSI feedback timing in 60 kHz subcarrier spacing is k*4,].

If a different number of symbols in each subcarrier spacing configure a single subframe, the number of the corresponding symbols on a band using each subcarrier spacing may be considered similarly. For example, when 14 symbols in a symbol interval T configure a single subframe on a subcarrier spacing 15 kHz band and 28 symbols in a symbol interval T/2 configure a single subframe on a subcarrier spacing 30 kHz band, if k on the subcarrier spacing 15 kHz band is defined as a symbol unit, it means that the CSI feedback timing can be interpreted ask at 15 kHz or 2*k at 30 kHz. And, if k on the subcarrier spacing 15 kHz band is defined as a subframe unit, it means that the CSI feedback timing can be interpreted as k at 15 kHz or 2*k at 30 kHz.

Option 1. CSI Feedback Timing Designation According to CSI Feedback Type

Depending on what kind of a CSI type is contained in (aperiodic) CSI that is reported, it is able to designate a corresponding CSI feedback timing. For example, it is able to designate a CSI feedback timing according to granularity of CSI feedback. To this end, it is able to define a group $K_1$ (e.g., subband RI, PMI, and CQI) including a feedback type of a plurality of subband CSIs and a group $K_2$ (e.g., wideband RI, PMI and CQI) including a feedback type of a single wideband CSI only. For another example, when PMI, CQI and RI of LTE are included in the group $K_1$, if a CRI for beam selection (or antenna port selection in a frequency region higher than 6 GHz) is calculated and selected by power measurement, a calculation time may become smaller than that for PMI/CQI/RI, whereby the CRI can be included in the group $K_2$. Here, each K group is a set of CSI requested by an (aperiodic) CSI request when the corresponding CSI request is made.

A base station instructs a UE to report a CSI about a prescribed group through a corresponding (aperiodic) CSI request. As the (aperiodic) CSI request is received by the UE in a subframe n, if a report including CSI (i.e., group $K_1$) for a plurality of subbands is indicated, the UE makes a report in a subframe (n+k1). If a single wideband CSI (i.e., group $K_2$) report is indicated only, the UE can make a report in a subframe (n+$k_2$), where $k_1 > k_2$.

Thus, the CSI feedback type can be defined as a plurality of groups $K_p$ ($K_1, K_2, \ldots, K_i, \ldots, K_p$), and different CSI feedback timings $k_1, k_2, \ldots, k_i, \ldots, k_p$ can be defined in the groups, respectively.

The above group K and the corresponding CSI feedback timing k may be defined in advance or configured by RRC. Particularly, if they are configured by RRC, a range of a value of $k_1$ configurable for each group K can be defined differently. For example, for the groups $K_1$ and $K_2$ like the above example, a value of $k_1$ can be configured as follows. The group K1 can be defined to be designated in a range of $\{3, 4, 5, 6\}$, and the group $K_2$ can be defined to be designated in a range of $\{1, 2, 3, 4\}$. In this case, the base station transmits an (aperiodic) CSI request to the UE through (UL) DCI in a manner that information indicating that CSI for a prescribed group is requested is included in the (aperiodic) CSI request.

Or, the base station may designate a CSI feedback timing set $T_i$ for the group $K_1$ instead of the CSI feedback timing value $k_1$. In this case, the base station designates an index of a CSI feedback timing together with a CSI request through DCI, and the UE can perform feedback at a CSI feedback timing corresponding to the signaled index among elements within the $T_i$ defined for the group $K_i$ corresponding to the corresponding CSI request. For example, regarding the groups $K_1$ and $K_2$ like the above example, when $T_1=\{3, 4, 5, 6\}$ and $T_2=\{1, 2, 3, 4\}$ are defined for the group $K_1$ and the group $K_2$, respectively, if the base station transmits 'CSI feedback timing index=1' to the UE, feedback can be performed in a subframe n+3 in case of the group $K_1$ or in a subframe n+1 in case of the group $K_2$. The corresponding CSI feedback timing index may be transmitted by being contained in an (aperiodic) CSI request, and more particularly, by being joint-encoded together with other information (e.g., group indication).

Or, a CSI feedback timing offset $k'_i$ can be defined for each group $K_i$. The base station may designate an index of a CSI feedback timing together with a CSI request including designation of the group $K_i$ to the user equipment through DCI, and the UE can perform CSI feedback at a CSI feedback timing (i.e., in a subframe n+k+$k'_i$) resulting from adding a CSI feedback timing k corresponding to the signaled CSI feedback timing index and a timing offset $k'_i$ defined in the group $k_i$ corresponding to the corresponding CSI request together. For example, when T=$\{0, 1, 2, 3\}$ is defined as a CSI feedback timing set and $k'_1=3$ and $k'_2=0$ are defined for the group $K_1$ and the group $K_2$ with respect to the groups $K_1$ and $K_2$, respectively, if the base station transmits 'CSI feedback timing index=2' to the UE, CSI feedback can be performed in a subframe n+(1+3) in case that a feedback type of the group $K_1$ is included in the CSI feedback. Or, CSI feedback can be performed in a subframe n+(1+0) in case that a feedback type of the group $K_2$ is included in the CSI feedback.

The corresponding CSI feedback timing index can be joint-encoded by being included in an (aperiodic) CSI request.

When the above-described common CSI feedback timing set T is defined, a minimum CSI feedback timing $k''_i$ can be defined for each group $K_i$. If a designated CSI feedback timing $t_i$ is smaller than $k''_i$, the UE can perform an operation as follows.

Delaying CSI feedback until a subframe max(n+$k''_i$, n+$t_i$)

Dropping CSI feedback

Feeding non-updated CSI back

In this case, specific $k_i$ and specific $k_j$ may differ from each other in unit. For example, $k_1$ may be a subframe unit and $k_2$ may be a symbol unit. Here, n may be interpreted differently depending on each case. For example, in case of n+$k_1$, n may become an (aperiodic) CSI request transmitted subframe. In n+$k_2$, n may refer to a first symbol of the (aperiodic) CSI request transmitted subframe.

Per CSI feedback type instead of a group K, $k_1, k_2, \ldots, k_i, \ldots, k_p$ can be defined. In this case, regarding a CSI feedback timing for each group $K_p$, a biggest ki among $k_1, k_2, \ldots, k_i, \ldots, k_p$ for a CSI feedback type belonging to the corresponding group $K_p$ can be defined as a CSI feedback timing for the corresponding group K.

Here, p, i.e., the maximum number of the group K can be defined (e.g., p=2). In this case, a group indicator information may be included in UL DCI by being encoded into $\log_2(p)$ (e.g., 1 bit) or joint-encoded together with other information (e.g., PQI (PDSCH Rate Matching and Quasi-CoLocation Indicator)) of the (aperiodic) CSI request.

Option 2. CSI Feedback Timing Designation According to CSI Estimating Method

A method of defining a group K according to a CSI estimating method instead of a CSI feedback type may be possible. A time required for CSI calculation may vary according to various CSI estimating methods considered in Full Dimension-MIMO (FD-MIMO) and New RAT situation. This includes an explicit feedback scheme such as a scheme of directly feeding back a channel coefficient or a scheme of feeding back (an eigenvector of) a covariance matrix as well as implicit feedback such as the existing codebook based CSI calculation. For example, since implicit feedback through Maximum Likelihood (ML) estimation is based on a scheme of calculating CQI for all ranks and PMI indexes, it requires a relatively long CSI calculation time. On the contrary, since explicit feedback, and particularly, a case of directly feeding back a channel coefficient does not require large calculation, a relatively short CSI calculation time is expected.

Therefore, by defining CSI feedback using a CSI estimating method differing in a required calculation time as a different group $K_1$, it is able to define $k_i$, $k'_i$ or $T_i$ different from each other. For example, by defining a scheme of reporting CSI, which uses a (large) codebook to a base station as a group $K_1$ and also defining a scheme of directly feeding back a channel coefficient as a group $K_2$, it is able to configure '$k_1=4$' and '$k_2=1$'. In this case, the CSI reporting schemes according to the two estimating methods can be defined as different feedback types. And, it is obvious that it is able to designate and use different $k_i$, $k'_i$ or $T_i$ by a scheme such as Option 1.

Option 3. CSI Feedback Timing Designation According to CSI Process

CSI differing in a necessary CSI feedback timing is assigned to each of a plurality of CSI processes and a different $k_i$, $k'_i$ or $T_i$ can be assigned according to each CSI process. For example, by configuring CSI process 1 to include subband CSI and also configuring CSI process 2 to include feedback of wideband CSI only, $k_1=4$ and $k_2=1$ can be defined for CSI process 1 and CSI process 2, respectively.

Or, like PQI of LTE, when signaling of an (aperiodic) CSI request is configured as RRC signaling, a different $k_i$, $k'_i$, or $T_i$ can be designated according to a combination of the respective CSI processes (and feedback types and estimating methods). In this case, according to the number of CSI processes becoming tartes of the corresponding (aperiodic) CSI request, the different $k_i$, $k'_i$ or $T_i$ can be defined in form of a table or function.

Option 4. CSI Feedback Timing Designation as UE Capability

A UE can inform a base station of its own $k_i$ according to CSI calculation capability of its own. The UE can inform the base station of a different $k_i$, $k'_i$ or $T_i$ according to Options 1 to 3 or elements (e.g., feedback types, estimating methods) described therein.

Or, the UE informs the base station of a CSI feedback timing k becoming a prescribed reference, and the base station can apply Options 1 to 3 by including the corresponding reference. For example, the UE can inform the base station of its own minimum CSI feedback timing k1 only, and the base station can use it in defining/signaling each $k_i$, $k'_i$ or $T_i$ by considering the corresponding $k_1$ in using Options 1 to 3.

Option 5. Number of Antenna Ports

A CSI feedback timing can be configured differently according to the number (corresponding to an aperiodic CSI request) of antenna ports of A-CSI-RS that should be measured by a UE. Namely, for the A-CSI-RS antenna port number $N_P$, a threshold $N_{P\_Ki}$ (i=1, 2, . . . , p-1, $N_{P\_K0}$=0) classifying each group K is defined each, and $k_i$, $k'_i$ or $T_i$ can be designated for each group. For example, if $N_{P\_Ki-1} < N_P <= N_{P\_Ki}$ is met, a corresponding A-CSI-RS is included in a group $K_i$. In this case, $k_i$, $k'_i$ or $T_i$ can be used. For example, when two groups K are defined and a value of $N_{P\_K1}$ configured by higher layer signaling from a base station or defined in advance is given, if the antenna port number of A-CSI-RS meets $N_P <= N_{P\_K1}$, it can be interpreted as a group $K_1$. If $N_P > N_{P\_K1}$ is met, it can be interpreted as a group $K_2$.

Or, if an aperiodic CSI request triggers CSI feedback for at least one A-CSI-RS resource, the total antenna port number $N_{P\_total}$ or the maximum antenna port number $N_{P\_max}$ can be used as a reference for classifying a group K in a similar manner of the antenna port. In this case, instead of $N_{P\_Ki}$, it is able to define a threshold value such as $N_{P\_total\_Ki}$ for the total antenna port number or $N_{P\_max\_Ki}$ for the maximum antenna port number.

Or, if an aperiodic CSI request triggers aggregated CSI feedback for A-CSI-RS transmitted in one or more instances, the total antenna port number or the maximum antenna port number for the aggregated CSI-RS can be used as a reference for classifying a group K in a similar manner of the antenna port number.

In the following, the group K can be used as a condition for configuring a different $k_i$, $k'_i$ or $T_i$ or a classification unit.

Option 6. Number of Resources

When a plurality of A-CSI-RS resources are defined for a single CSI process and CSI for two or more A-CSI-RS resources needs to be calculated (e.g., CRI), a base station can configure a feedback timing for a UE according to the number of A-CSI-RS resources (corresponding to an aperiodic CSI request) that should be measured. Namely, for the A-CSI-RS resource number $N_R$, a value $N_{R\_Ki}$(i=1, 2, . . . , p-1, $N_{R\_K0}$=0) classifying each group K is defined each, and $k_i$, $k'_i$ or $T_i$ can be designated for each group. For example, if $N_{R\_Ki-1} < N_R <= N_{R\_Ki}$ is met, a corresponding A-CSI-RS is included in a group $K_i$. In this case, it is able to use an aperiodic feedback timing using the designated $k_i$, $k'_i$ or $T_i$. For example, when two groups K are defined and a value of $N_{R\_K1}$ configured by higher layer signaling from a base station or defined in advance is given, if the resource number $N_R$ of A-CSI-RS meets $N_R <= N_{R\_K1}$, it can be interpreted as a group $K_1$. If $N_R > N_{R\_K1}$ is met, it can be interpreted as a group $K_2$.

Or, if an aperiodic CSI request triggers aggregated CSI feedback for A-CSI-RS transmitted in one or more instances, the total antenna port number for the aggregated CSI-RS can be used as a reference for classifying a group K in a similar manner of the resource number.

Option 7. Number of CSI Processes

In case that a base station can instruct a UE to calculate CSI for two or more CSI processes, the base station can configure a CSI feedback timing for the UE differently according to the CSI process number corresponding to an aperiodic CSI request. Namely, for the CSI process number NC designated in the aperiodic CSI request, a value for classifying each group K, i.e., $N_{C\_Ki}$ (i=1, 2, . . . , p-1, $N_{C\_K0}$=0) is defined each. And, $k_i$, $k'_i$ or $T_i$ can be designated for each group.

For example, if $N_{C\_Ki-1} < N_C <= N_{C\_Ki}$ is met, a corresponding A-CSI-RS is included in a group $K_i$. In this case, it is able to determine an aperiodic feedback timing using the designated $k_i$, $k'_i$ or $T_i$. For example, when two groups K are defined and a value of $N_{C\_K1}$ configured by higher layer signaling from a base station or defined in advance is given, if the CSI process number $N_C$ of A-CSI-RS meets $N_C <= N_{C\_K1}$, it can be interpreted as a group $K_1$. If $N_C > N_{C\_K1}$ is met, it can be interpreted as a group $K_2$.

Thresholds such as $N_{P\_Ki}$, $N_{P\_total\_Ki}$, $N_{P\_max\_Ki}$, $N_{R\_Ki}$, and $N_{C\_Ki}$ described above and $k_i$, $k'_i$ or $T_i$ for each group K can be designated to the UE using L2 signaling such as MAC signaling for higher flexibility instead of L3 signaling such as RRC signaling. Particularly, since flexibility may be further important to the case of $k'_i$ not using dynamic signaling, L2 signaling can be more meaningful.

In case of the signaling for an (aperiodic) CSI request through DCI described through the above options 1 to 7, a group $K_i$, which is to be fed back, of the (aperiodic) CSI request can be implicitly designated to a UE according to a CSI feedback timing designated to the UE by a base station. In this case, a group Ki which is to be fed back is defined according to a feedback timing T, which can be designated to the UE by the base station, and a range of T. For example, when T={1, 2, 3, 4}, a group $K_1$ can be designated in case of {1, 2} or a group $K_2$ can be designated in case of {3, 4}. In this case, if the base station transmits T=3 by having it included in an (periodic) CSI indication, the UE can feed back CSI included in the group $K_2$ in a subframe n+3. If the base station transmits T=1, the UE can feed back CSU included in the group $K_1$ in a subframe n+1.

The schemes described in the above options 1 to 7 may be interpreted differently on PDCCH or EPDCCH (Enhanced PDCCH). For example, for signaling through PDCCH, an indicated CSI feedback timing is used as it is. Yet, a timing indicated through EPDCCH may be interpreted as an indicated CSI feedback timing+1(TTI).

CSI Feedback Timing Designation According to Feedback Content With Reference to A-CSI-RS Tx Timing The above-described 'CSI feedback timing designation according to CSI feedback content' considers an environment when A-CSI-RS (aperiodic CSI-RS) is transmitted to a UE together with an aperiodic CSI request. Namely, a time from an A-CSI-RS Tx timing for calculation of CSI is equal to a time from a timing of receiving an aperiodic CSI request. Yet, when a Tx timing of A-CSI-RS is separated from an aperiodic CSI request, if $k_1$ and $k_2$ for the above CSI feedback timing are defined from an aperiodic CSI request timing, it may have a meaning different from a time necessary to calculate CSI using A-CSI-RS actually. Hence, $k_i$, $k'_i$ or $T_i$ can be defined as a time taken from a timing of performing a transmission of $k_i$, $k'_i$ or $T_i$ to a timing of feeding back CSI. Namely, it means that a subframe (or a resource equivalent to the subframe) defined as the above-described reference resource is defined not as an aperiodic CSI request transmitted timing but as an A-CSI-RS transmitted timing.

Here, an indication of A-CSI-RS can be classified as the following situations depending on a presence or non-presence of separation from an aperiodic CSI request.

Situation 1. Through a DCI such as an aperiodic CSI request or a separate DCI transmitted after the timing, an A-CSI-RS Tx timing is indicated.

Figure 6:
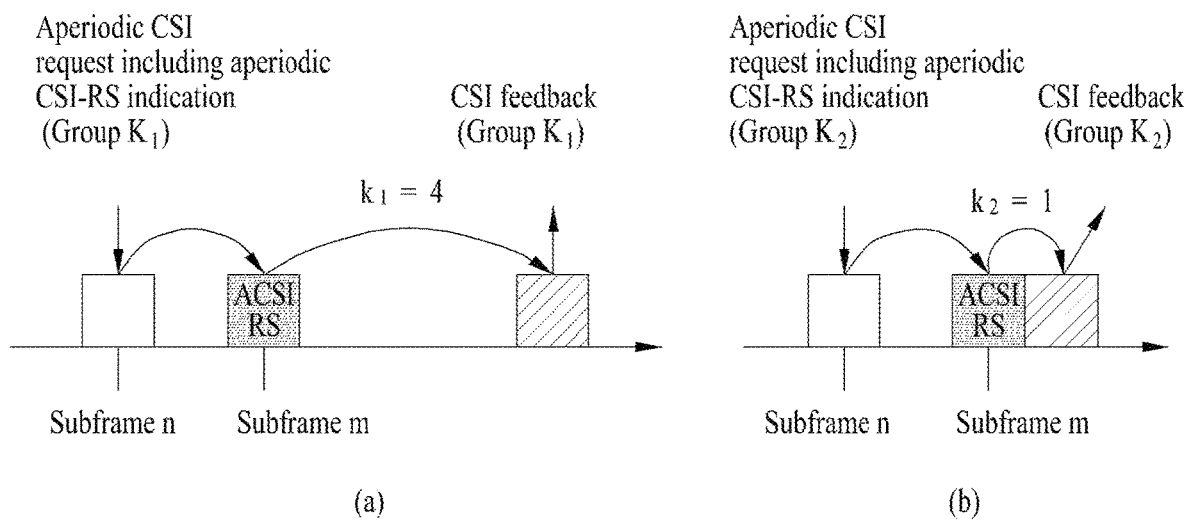
FIG. 6 shows an aperiodic CSI request having an aperiodic CSI-RS indication included therein and a corresponding CSI feedback timing.

In this case, the options 1 to 4 of the above-described 'CSI feedback timing designation according to CSI feedback content' can be used in a manner of substituting that $k_i$, $k'_i$ or $T_i$ is defined from a Tx timing of A-CSI-RS, a subframe m instead of an aperiodic CSI request timing, a subframe n. For example, if $k_i$ is defined for a group $K_i$, a CSI feedback timing may become a subframe $m+k_i$ like FIG. 6 instead of a subframe $n+k_i$ of the above-described 'CSI feedback timing designation according to CSI feedback content'.

Figure 7:
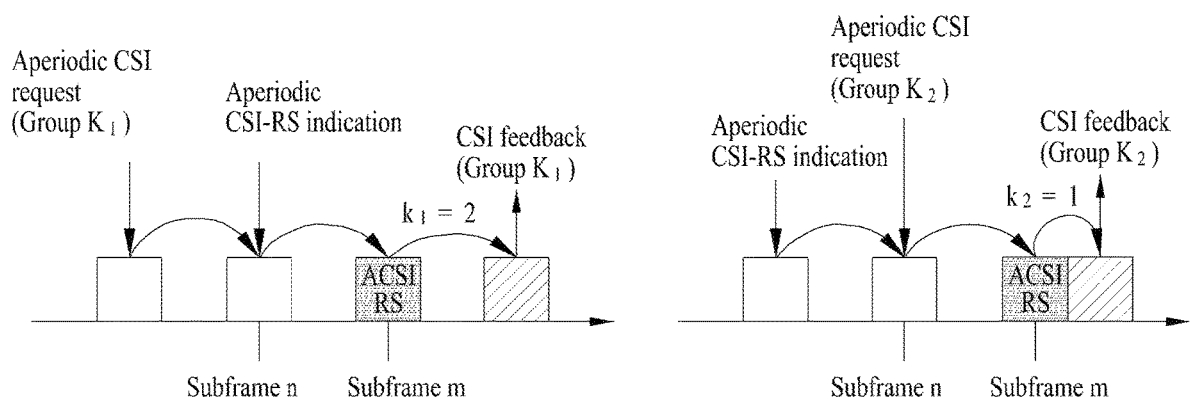
FIG. 7 shows an aperiodic CSI-RS indication, an aperiodic CSI request and a corresponding CSI feedback timing.

FIG. 7 shows a case that although A-CSI-RS indication is transmitted on a separate DCI, an A-CSI-RS included DCI is transmitted simultaneously with or behind an aperiodic CSI request included DCI. In this case, the options 1 to 4 of the above-described 'CSI feedback timing designation according to CSI feedback content' can be also used in a manner of substituting that $k_i$, $k'_i$ or $T_i$ is defined from a Tx timing of A-CSI-RS, a subframe m instead of an aperiodic CSI request timing, a subframe n. Yet, unlike the example shown in FIG. 6, the aperiodic CSI request may designate a DCI that will include a content about the corresponding A-CSI-RS instead of directly designating A-CSI-RS becoming a reference resource.

Situation 2. A separate DCI (UL, DL) indicating A-CSI-RS precedes an aperiodic CSI request.

Figure 8:
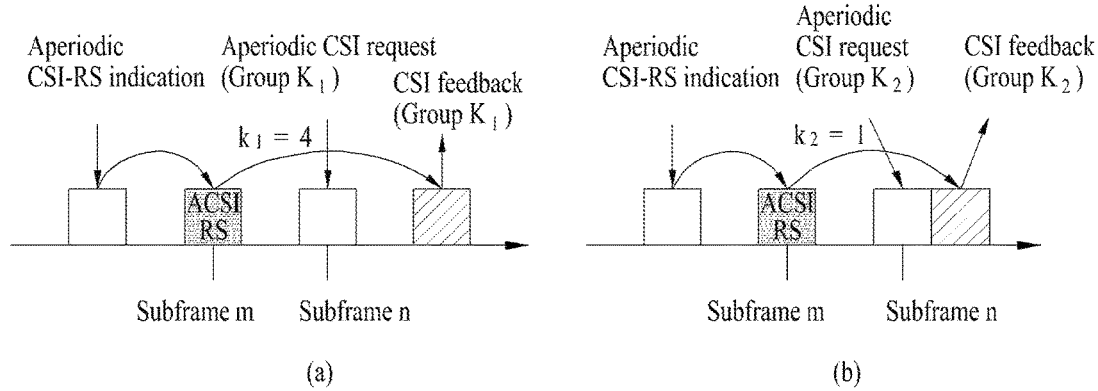
FIG. 8 shows an aperiodic CSI-RS indication, an aperiodic CSI request and a corresponding CSI feedback timing.

In this case, A-CSI-RS can be typically transmitted ahead of an aperiodic CSI request. Therefore, as shown in FIG. 8(b), an aperiodic CSI reporting, subframe $m+k_i$ timing may precede an aperiodic CSI request timing. Hence, in this case, a minimum value $k_{min}$ of an actual aperiodic CSI reporting timing can be defined. Here, $k_{min}$ can be used as follows i. An aperiodic CSI reporting timing may be defined as a subframe $max(m+k_i, n+1)$.

ii. If $m+k_i<n+1$, CSI of a group Ki using a corresponding A-CSI-RS is not reported.

In common to the above two cases, if a base station transmits an (aperiodic) CSI request to a UE together with a CSI feedback timing [e.g., defining a common $T_i$ between group $K_S$ and designating an index within a corresponding set], it is necessary to transmit A-CSI-RS before at least $k_i$ subframes from a CSI feedback timing. Hence, if the base station triggers a CSI reporting of a group $K_i$, the UE does not expect that A-CSI-RS is transmitted from a timing before $k_i$ time units (e.g., subframe units in the present specification) starting from an (aperiodic) CSI report timing, but calculates CSI using A-CSI-RS transmitted before the corresponding timing. If the base station transmits A-CSI-RS after a timing before $k_i$ time units starting from an (aperiodic) CSI report timing, the UE may omit the CSI reporting or report CSI without updating the CSI.

When the above-described technique is applied actually, it is applicable independently or by being combined with other techniques. Although the above patent describes a proposed method based on the 3GPP LTE system for clarity of the description, the scope of the proposed methods applied systems can be extended to other systems (e.g., UTRA, etc.), and more particularly, to 5G and technological candidates thereof as well as to the 3GPP LTE system.

Figure 9:
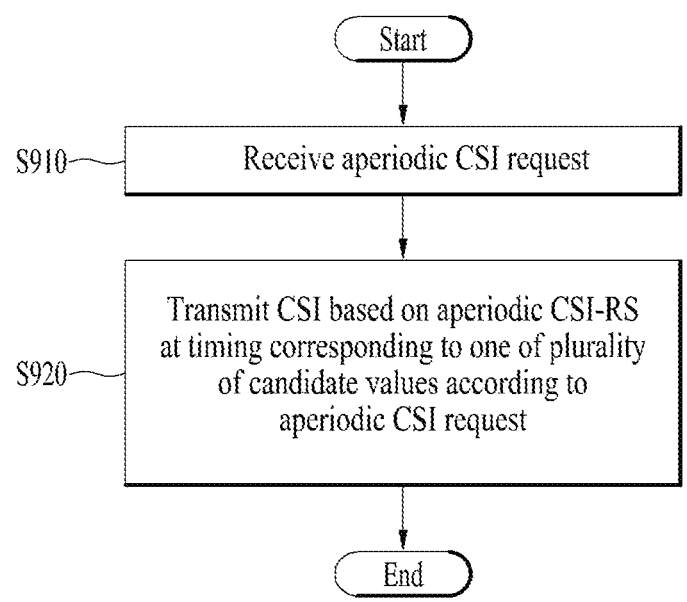
FIG. 9 shows an operation of a user equipment according to one embodiment of the present invention.

FIG. 9 shows an operation according to one embodiment of the present invention.

FIG. 9 relates to a method of performing a channel state reporting based on an aperiodic Channel State Information-Reference Signal (CSI-RS) in a wireless communication system.

A terminal may receive the aperiodic Channel State Information (CSI) request from a base station [S910]. The UE may transmit CSI based on an aperiodic CSI-RS at a timing corresponding to one of a plurality of candidate values according to the aperiodic CSI request [S920]. The plurality of the candidate values are selected according to a CSI relevant parameter. And, the CSI relevant parameter may include at least one of a type of information included in the CSI, frequency granularity of the CSI, information about whether or not to use a codebook in case of deriving the CSI, and the number of antenna ports of the CSI-RS.

The plurality of the candidate values may be configured in advance by Radio Resource Control (RRC) signaling. Moreover, one of the plurality of the candidate values may be indicated by a pre-designated field of downlink control information.

Moreover, the pre-designated field of the downlink control information may be joint-encoded with another information field.

Additionally, a timing offset, which is determined depending on whether the aperiodic CSI request is received on a physical downlink control channel or an enhanced physical downlink control channel, is applicable to a timing at which the CSI based on the aperiodic CSI-RS is transmitted.

Moreover, a plurality of timing groups may be defined for the CSI relevant parameter each, and one or more candidate values may be defined per timing group.

Although embodiments according to the present invention are described schematically with reference to FIG. 9, the embodiment relevant to FIG. 9 may include at least one portion of the aforementioned embodiment(s) alternatively or additionally.

Figure 10:
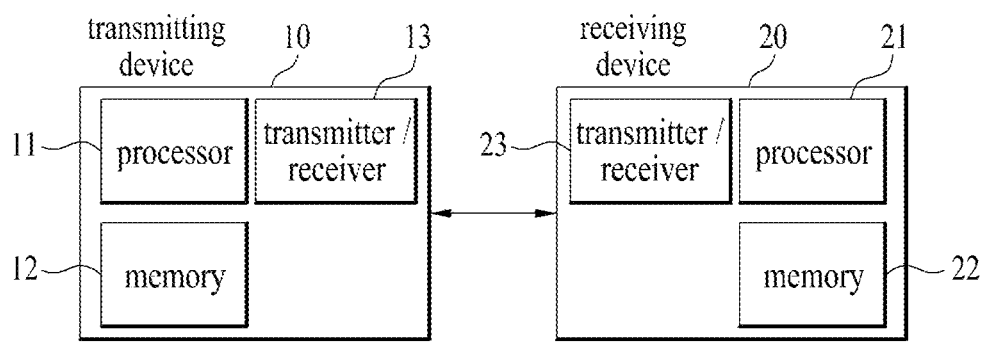
FIG. 10 is a block diagram of a device for implementing embodiment(s) of the present invention.

FIG. 10 is a block diagram of a transmitting device 10 and a receiving device 20 configured to implement exemplary embodiments of the present invention. Referring to FIG. 10, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method for reporting channel state based on an aperiodic Channel State Information-Reference Signal (CSI-RS) in a wireless communication system, the method comprising:
   receiving a physical downlink control channel (PDCCH) for scheduling a physical uplink shared channel (PUSCH), the PDCCH including an aperiodic Channel State Information (CSI) request; and
   transmitting, through the PUSCH, CSI based on the aperiodic CSI-RS at a timing corresponding to one of a plurality of candidate values according to the aperiodic CSI request,
   wherein the plurality of the candidate values are selected according to a CSI relevant parameter,
   wherein the CSI relevant parameter comprises at least one selected from the group consisting of a type of information included in the CSI, frequency granularity of the CSI, information about whether or not to use a codebook in case of deriving the CSI, and the number of antenna ports of the CSI-RS, and
   wherein a plurality of timing groups are defined for the CSI relevant parameter each and wherein one or more candidate values are defined per timing group.

2. The method of claim 1, wherein the plurality of the candidate values are configured in advance by Radio Resource Control (RRC) signaling.

3. The method of claim 1, wherein one of the plurality of the candidate values is indicated by a pre-designated field of downlink control information.

4. The method of claim 3, wherein the pre-designated field of the downlink control information is joint-encoded with another information field.

5. A terminal configured to report for reporting channel state based on an aperiodic Channel State Information-Reference Signal (CSI-RS) in a wireless communication system, the terminal comprising:
   a transmitter and receiver;
   at least one processor; and
   at least one computer memory operably connectable to the at least one processor and storing instructions that, based on being executed by the at least one processor, perform operations comprising:
   receiving a physical downlink control channel (PDCCH) for scheduling a physical uplink shared channel (PUSCH), the PDCCH including an aperiodic Channel State Information (CSI) request; and
   transmitting, through the PUSCH, CSI based on the aperiodic CSI-RS at a timing corresponding to one of a plurality of candidate values according to the aperiodic CSI request,
   wherein the plurality of the candidate values are selected according to a CSI relevant parameter,
   wherein the CSI relevant parameter comprises at least one selected from the group consisting of a type of information included in the CSI, frequency granularity of the CSI, information about whether or not to use a codebook in case of deriving the CSI, and the number of antenna ports of the CSI-RS, and
   wherein a plurality of timing groups are defined for the CSI relevant parameter each and wherein one or more candidate values are defined per timing group.

6. The terminal of claim 5, wherein the plurality of the candidate values are configured in advance by Radio Resource Control (RRC) signaling.

7. The terminal of claim 5, wherein one of the plurality of the candidate values is indicated by a pre-designated field of downlink control information.

8. The terminal of claim 7, wherein the pre-designated field of the downlink control information is joint-encoded with another information field.

9. A processing apparatus configured to control a terminal to report channel state based on an aperiodic Channel State Information-Reference Signal (CSI-RS) in a wireless communication system, the processing apparatus comprising:
   at least one processor; and
   at least one computer memory operably connectable to the at least one processor and storing instructions that, based on being executed by the at least one processor, perform operations comprising:
   receiving a physical downlink control channel (PDCCH) for scheduling a physical uplink shared channel (PUSCH), the PDCCH including an aperiodic Channel State Information (CSI) request; and
   transmitting, through the PUSCH, CSI based on the aperiodic CSI-RS at a timing corresponding to one of a plurality of candidate values according to the aperiodic CSI request,
   wherein the plurality of the candidate values are selected according to a CSI relevant parameter, and
   wherein the CSI relevant parameter comprises at least one selected from the group consisting of a type of information included in the CSI, frequency granularity of the CSI, information about whether or not to use a codebook in case of deriving the CSI, and the number of antenna ports of the CSI-RS and
   wherein a plurality of timing groups are defined for the CSI relevant parameter each and wherein one or more candidate values are defined per timing group.

10. The processing apparatus of claim 9, wherein the plurality of the candidate values are configured in advance by Radio Resource Control (RRC) signaling.

11. The processing apparatus of claim 9, wherein one of the plurality of the candidate values is indicated by a pre-designated field of downlink control information.

12. The processing apparatus of claim 11, wherein the pre-designated field of the downlink control information is joint-encoded with another information field.

* * * * *